(12) United States Patent
Gu

(10) Patent No.: US 6,502,843 B1
(45) Date of Patent: Jan. 7, 2003

(54) ANTI-REVERSE SYSTEM FOR TWIST VEHICLE

(75) Inventor: Hong-Jiun Gu, Taipei (TW)

(73) Assignees: Hong Jiun Gu, Taipei (TW); Jar Chen Wang, Cerritos, CA (US)

(*) Notice: Subject to any disclaimer, the term of this patent is extended or adjusted under 35 U.S.C. 154(b) by 0 days.

(21) Appl. No.: 09/967,798

(22) Filed: Oct. 1, 2001

(51) Int. Cl.⁷ .............................................. B62M 29/00
(52) U.S. Cl. ........................ 280/218; 280/237; 280/246
(58) Field of Search ................................ 280/218, 236, 280/237, 240, 242.1, 246, 255, 252

(56) References Cited

U.S. PATENT DOCUMENTS

| | | | | |
|---|---|---|---|---|
| 3,663,038 A | * | 5/1972 | Hendricks | 280/218 |
| 3,863,950 A | * | 2/1975 | Jordan | 280/218 |
| 4,076,269 A | * | 2/1978 | Muguruma | 280/218 |
| 4,200,304 A | * | 4/1980 | Hwang | 280/218 |
| 4,930,796 A | * | 6/1990 | Harrod | 280/87.021 |
| 6,386,304 B1 | * | 5/2002 | Wang | 180/65.1 |
| 2002/0084616 A1 | * | 7/2002 | Gu | 280/218 |

FOREIGN PATENT DOCUMENTS

JP          52-2634     * 10/1977

* cited by examiner

Primary Examiner—Avraham Lerner
(74) Attorney, Agent, or Firm—Raymond Y. Chan; David & Raymond Patent Group

(57) ABSTRACT

A twist vehicle includes a vehicle frame, a steering unit, a twisting unit and a connecting member in which when subsequent clockwise and anti-clockwise movements are imparted to the steering unit, the movements are then transferred to the twisting unit, causing the twisting unit to rotate accordingly, and therefore drive the twist vehicle to move forwardly. The twist vehicle further includes an anti-reverse system which includes at least two locking member provided to the pair of driving wheels respectively, and a pair of locking panels in which each locking panel has at least one biasing member for rotatably engaging with the locking member, so as to restrict the pair of driving wheels to be rotated in one direction only.

19 Claims, 5 Drawing Sheets

ANTI-REVERSE SYSTEM FOR TWIST VEHICLE

BACKGROUND OF THE PRESENT INVENTION

1. Field of Invention

The present invention relates to a twist vehicle, and more particularly to a twist vehicle incorporated with an anti-reverse system wherein the driving wheels of the twist vehicle are restricted to rotate in one direction only, so that any unintentional backward movement of the twist vehicle is prevented.

2. Description of Related Arts

Referring to FIGS. 1–2 of the drawings, a conventional twist vehicle comprises a vehicle frame 10, a connecting member 21 connected to front portion of the vehicle frame 10, a steering unit 20 rigidly connected to the a end portion of the connecting member 21, a twisting unit 22 rigidly connected to the another end portion of the connecting member 21 and pivotally connected to the vehicle frame 10 about a pivot 30, and a pair of rear wheels 11,12 rotatably connected to two sides of rear portion of the vehicle frame 20 respectively. The twisting unit 22 comprises a twisting frame 2 and a pair of driving wheels 221, 222 rotatably connected to the rear portion of the twisting frame 2 in such a manner that the pair of wheels 221, 222 is spacdley apart from each other and spacedly apart from the pivot 30. When clockwise and anti-clockwise movements are subsequently imparted to the steering unit 20, the connecting member 21 transfers the motions to the twisting unit 22, causing the twisting unit 22 to rotate accordingly about the pivot 30. Amid a series of clockwise and anti-clockwise movements applied to the steering unit 20, the twist vehicle is driven to move forwardly.

Such kind of twist vehicle requires a flat ground with even coefficient of friction in order for it to function properly. However, in reality, a ground seldom has constant coefficient of friction. If the friction between the pair of driving wheels and the ground is inadequate, the efficiency of the twist vehicle will become smaller, i.e. the movement of the twist vehicle is less than that of the movement as if the friction between the pair of driving wheels and the ground is adequate. In this case, very often, the pair of driving wheels 221, 222 moves in reverse direction due to inertia of the vehicle frame and the rider of the twist vehicle. Even worse, if the rider keeps on twisting the steering unit vigorously, the twist vehicle may flip over due to too rapid changes of center of gravity.

SUMMARY OF THE PRESENT INVENTION

A main object of the present invention is to provide a twist vehicle which comprises a vehicle frame, a steering unit, a twisting unit and a connecting member in which when subsequent clockwise and anti-clockwise movements are imparted to the steering unit, the movements are then transferred to the twisting unit, causing the twisting unit to rotate accordingly, and therefore drive the twist vehicle to move forwardly.

Another object of the present invention is to provide a twist vehicle which comprises an anti-reverse system for restricting the pair of driving wheels of the twist vehicle from moving backwardly with respect to vehicle frame.

Another object of the present invention is to provide a twist vehicle which comprises an anti-reverse system which comprises at least two locking member provided to the pair of driving wheels respectively, and a pair of locking panels in which each locking panel has at least one biasing member for rotatably engaging with the locking member, so as to restrict the pair of driving wheels to be rotated in one direction only.

To enable a further understanding of the objectives and the underlying technological methods, the brief description of the drawings below is followed by a detailed description of the preferred embodiment.

BRIEF DESCRIPTION OF THE DRAWINGS

FIG. 3–1 is a side view of an anti-reverse system for a twist view according to a second preferred embodiment of the present invention.

DETAILED DESCRIPTION OF THE PREFERRED EMBODIMENT

Figure 1:
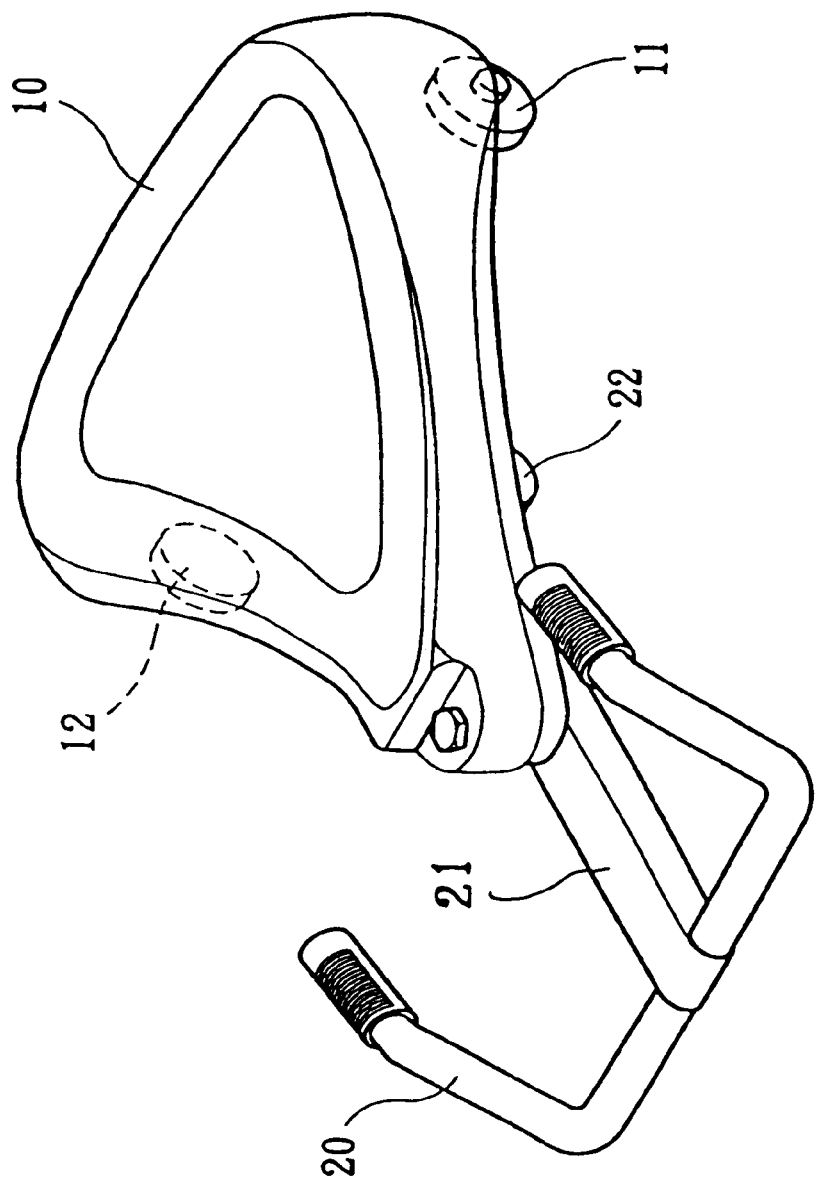
FIG. 1 is an isometric drawing of a conventional twist vehicle.
Figure 2:
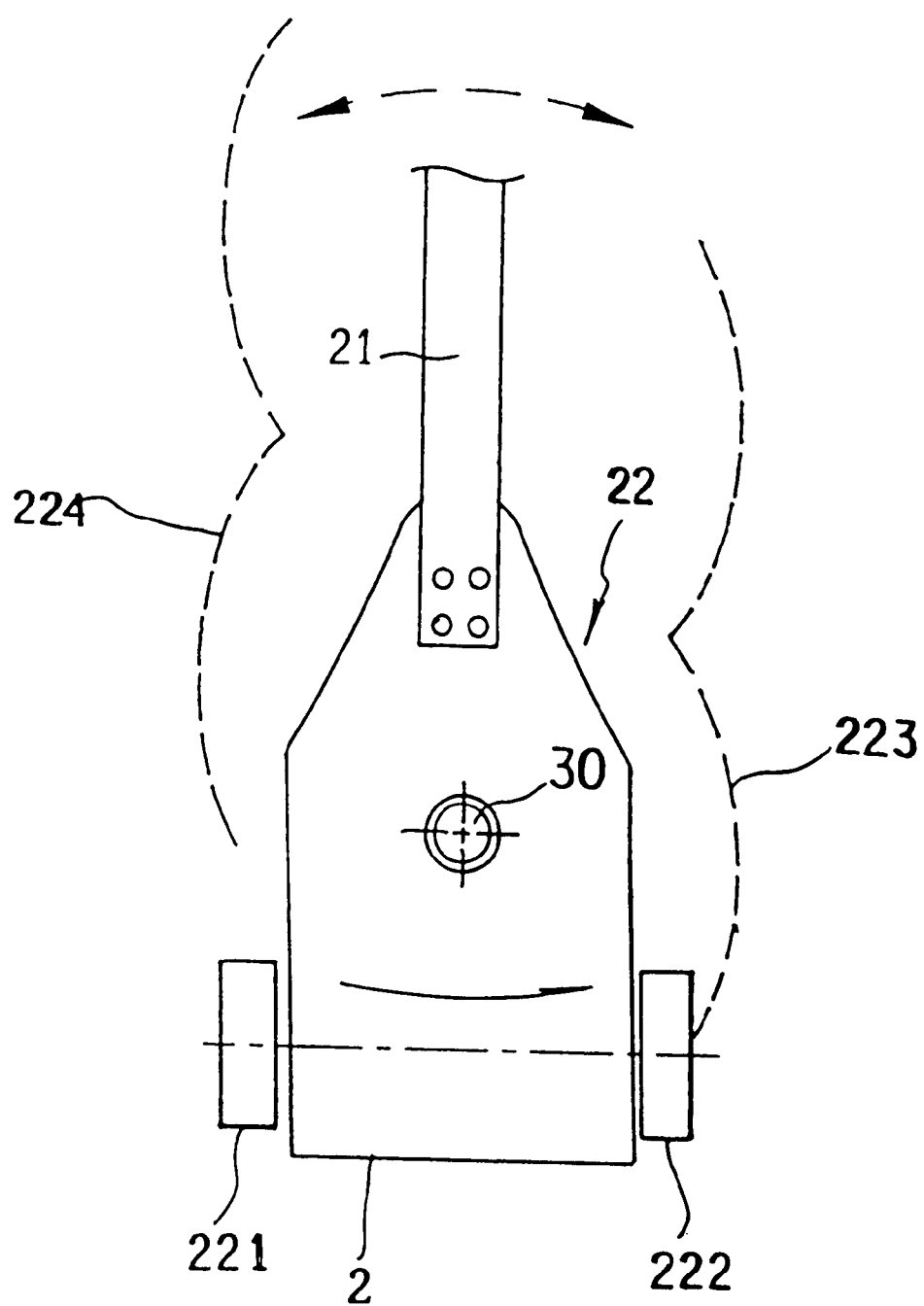
FIG. 2 is a top view of the twisting unit of a conventional twist vehicle.

Referring to FIGS. 1–2 of the drawings, a conventional twist vehicle comprises a vehicle frame 10, a connecting member 21, a steering unit 20 rigidly connected to the a end portion of the connecting member 21, a twisting unit 22 rigidly connected to the another end portion of the connecting member 21 and pivotally connected to the vehicle frame 10 about a pivot 30, and a pair of rear wheels 11,12 rotatably connected to two sides of rear portion of the vehicle frame 20 respectively. The twisting unit 22 comprises a twisting frame 2 and a pair of driving wheels 221, 222 rotatably connected to the rear portion of the twisting frame 2 in such a manner that the pair of wheels 221, 222 is spacdley apart from each other and spacedly apart from the pivot 30. When clockwise and anti-clockwise movements are subsequently imparted to the steering unit 20, the connecting member 21 transfers the motions to the twisting unit 22, causing the twisting unit 22 to rotate accordingly about the pivot 30. For each rotating motion of the twisting unit 22, such as in case of a clockwise rotation, the left driving wheel 221 will act as a center for the right driving wheel 222 to move forwardly following a circular locus 223. The same principle applies in case of an anti-clockwise rotation, resulting in another circular locus 224 of left driving wheel 221. Consequently, amid a series of clockwise and anti-clockwise movements applied to the steering unit 20, the twist vehicle is driven to move forwardly.

Figure 3:
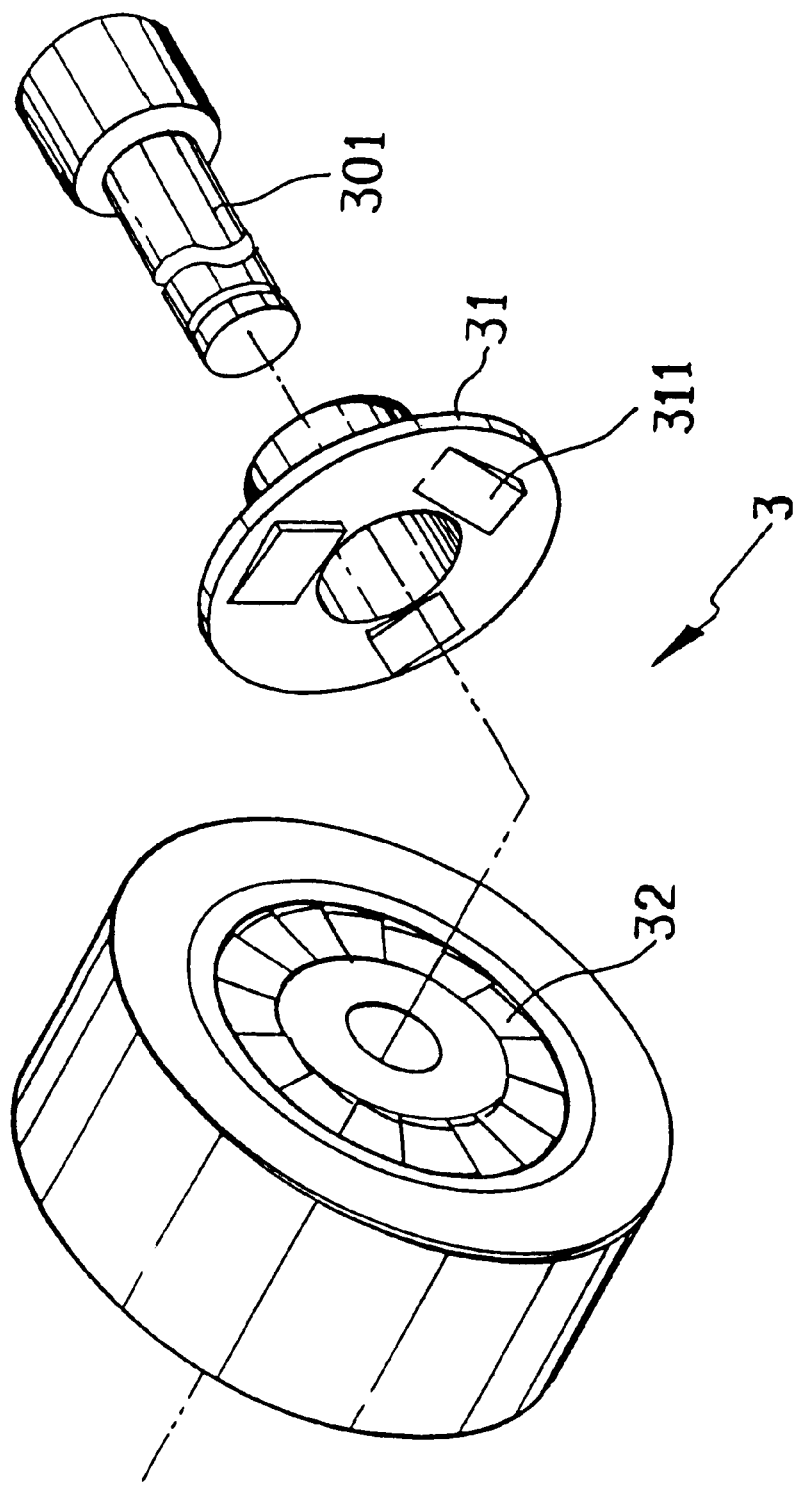
FIG. 3 is an isometric view of an anti-reverse system for a twist vehicle according to a first preferred embodiment of the present invention.
Figures 1, 3:
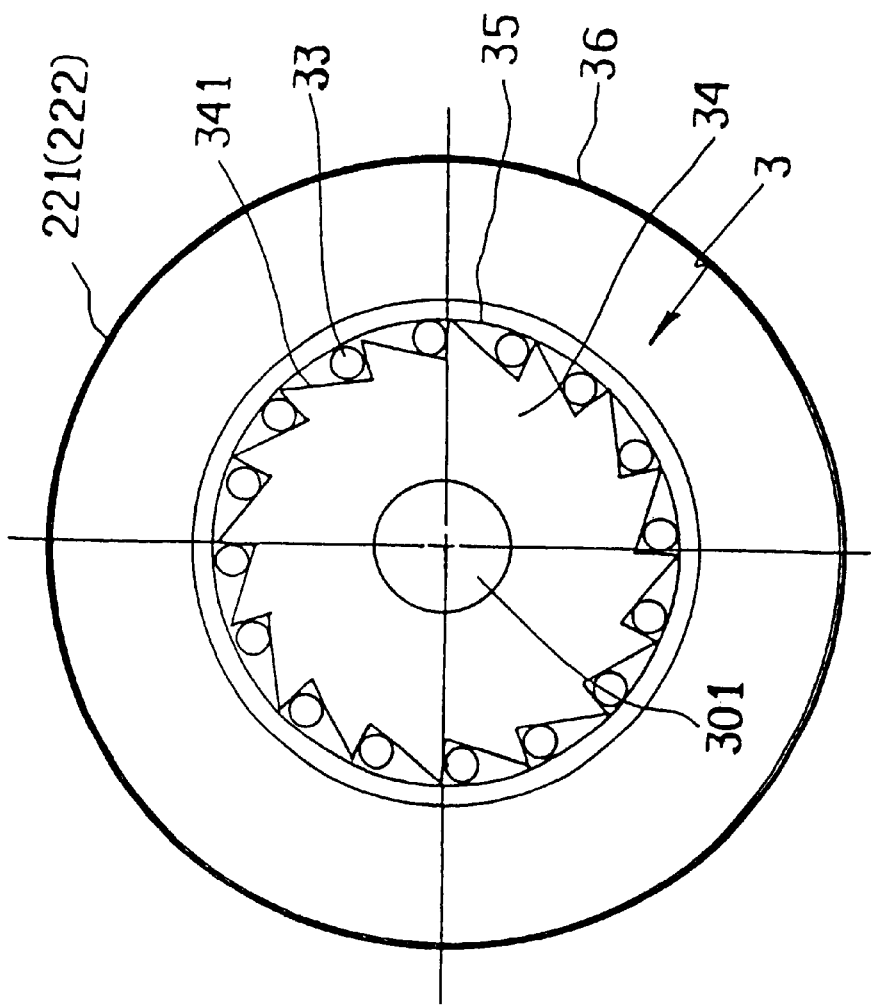

Referring to FIG. 3 of the drawings, a twist vehicle comprising an anti-reverse system according to a first preferred embodiment of the present invention is illustrated. The twisting unit 22 further comprises a driving wheels axle 301 connecting the pair of driving wheels 221, 222 of the twisting unit 22, wherein the pair of driving wheels has a hollow cavity at the center portion. The anti-reverse system comprises a pair of locking panels 31 connected to two end portions of the driving wheel axle 301 respectively, and at least a pair of locking members 32 rigidly and coaxially connected to the pair of driving wheels 221, 222 respectively, so that the pair of locking members 32 rotate in the way as the pair of driving wheels 221, 222 respectively. The pair of locking panels 31 each has at least one biasing member 311 for rotatably engaging with the pair of locking member 32 respectively. The pair of locking members 32 are essentially two ratchet-wheels each having teeth provided inside the hollow cavity of each driving wheels 221, (222). The teeth of the ratchet-wheel each has an inclined surface for engaging with the biasing member 311, and is arranged in such a manner that the thicker end of each tooth is adjacent to a thinner end of the next tooth. Each biasing member 311 also has an inclined surface for rotatably engaging with a tooth of the locking member 32. Each biasing member 311 is engaged with each tooth of each locking member 32 in such a manner that the thinner end of each biasing member is engaged with the thicker end of each tooth of the locking member 32. Such an arrangement restricts the pair of driving wheels 221,222 to rotate in one direction only—the forward direction in this case, with respect to the vehicle frame 10. When the pair of driving wheels rotates backwardly with respect to the vehicle frame 10, the thicker end of each of the biasing member 311 will bias against the thicker end of a tooth of each locking member 32, thus restricting further movement of the pair of driving wheels 221,222.

Referring to FIG. 3–1 of the drawings, a second embodiment illustrates an alternative mode of the above first embodiment of the present invention. The pair of locking panels 31 each has saw-toothed circumference for biasing against the locking member 34. The biasing member 341 in this second embodiment is the surface formed between two teeth of each locking panels 31. The locking member 33 is essentially a numbers of locking balls provided inside the hollow cavity of each driving wheel 221 (222) in which each locking ball is placed between two teeth of each locking panel 31 for biasing against the biasing member 341. The anti-reverse system further comprises a pair of inner pressing rings 35 attached at the two inner surfaces of the two hollow cavities of the pair of driving wheels 221, 222 respectively. The inner surface of a inner pressing ring 35, together with a biasing member 341 define the boundary of the movement of a locking member 33.

In other words, each locking member 33 is retained in position by a biasing member 341, which is defined as the surface between two teeth of the locking member 34, and the surface of one inner pressing ring 35. Such an arrangement allows the pair of driving wheels 221, 222 rotates in clockwise direction but not in anti-clockwise direction. When the pair of driving wheels 221, 222 rotates in anti-clockwise direction, each locking member 33 will be moved to the narrower end of the boundary defined by the biasing member 341 and the inner pressing ring 35. As a result, the biasing member plus the surface of the inner pressing ring 35 together restrict further movement of the locking member 33 and therefore stop the driving wheel 221, (222) from further movement.

Figure 4:
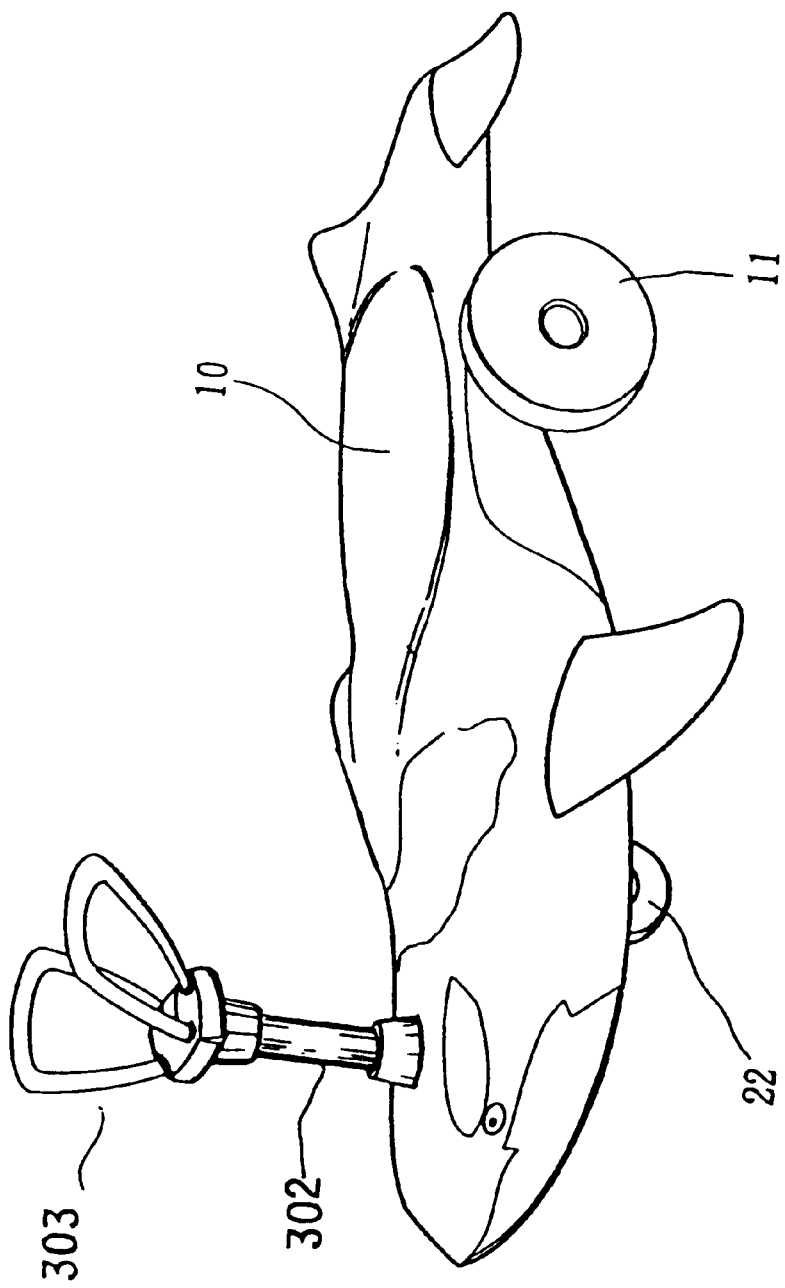
FIG. 4 is an isometric view of a first alternative mode of the twist vehicle.

Referring to FIG. 4 of the drawings, an alternative mode of the twist vehicle is illustrated. The twist vehicle comprises a steering unit 303, a connecting member 302 having one end portion connected to the steering unit 303 such that any rotational movement of the steering unit 303 will cause the connecting member 302 to rotate accordingly, and a twisting unit 22 is longitudinally connected to another end portion of the connecting member 302 so that when the connecting member 302 rotates, the twisting unit 22 rotates accordingly, causing the twist vehicle to move forwardly. Note that the vehicle frame 10 of the twist vehicle may also be decorated like certain kinds of animal to attract other peoples.

What is claimed is:

1. A twist vehicle, comprising:
   a vehicle frame;
   a twisting unit which comprises a pair of driving wheels wherein said pair of driving wheels is rotatably connected to said twisting unit in such a manner that said pair of driving wheels spaces apart from each other and spaces apart from a front portion of said twisting unit, and wherein said twisting unit is rotatably mounted under said vehicle frame;
   a connecting member connected to a front portion of said twisting unit;
   a steering unit connected to said connecting member, so that when clockwise and anti-clockwise movements are subsequently imparted to said steering unit, said connecting member rotates accordingly, causing said twisting unit to rotate accordingly, and therefore driving said twist vehicle to move forwardly; and
   an anti-reverse system which comprises:
      a pair of locking panels coaxially connected to two end portions of said driving wheels axle;
      at least one biasing member formed on each of said locking panels to stop a backward rotation of each driving wheel; and
      at least a pair of locking members coaxially provided on said pair of driving wheels for rotatably engaging with said biasing member of said pair of locking panels respectively, so that when said pair of driving wheels rotate in backward direction with respect to said vehicle frame, said pair of locking members is driven to bias against said biasing members of said locking panels, causing said pair of driving wheels to stop rotating.

2. A twist vehicle, as recited in claim 1, wherein each of said pair of locking panels having said biasing member has an inclined surface outwardly protruded from a surface of one of said locking panels that faces said one of said pair of driving wheels, thus generating a thicker end portion and a thinner end portion for rotatably engaging with said locking member.

3. A twist vehicle, as recited in claim 2, wherein said locking members are essentially a pair of ratchet-wheels, which have at least one tooth for each, coaxially connected to said pair of driving wheels respectively, so that said pair of locking members rotate as said pair of driving wheels rotate, wherein each tooth of said locking members has an inclined surface for rotatably engaging with said biasing member, and wherein said tooth is arranged in such a manner that a thicker end of said tooth is adjacent to a thinner end of a next tooth, so that when engaged with said biasing members, said pair of driving wheels are only capable of rotating in one direction.

4. A twist vehicle, as recited in claim 3, wherein said thinner end of said biasing member is engaged to said thicker end of said tooth of said locking member, and said thicker end of said biasing member is engaged to said thinner end of said tooth of said locking member, so that one direction of rotation of said pair of driving wheels is blocked by said thicker end of biasing member.

5. A twist vehicle, as recited in claim 4, wherein each of said pair of driving wheels has hollow cavities formed at a center portion, for receiving each of said pair of locking members respectively.

6. A twist vehicle, as recited in claim 1, wherein said locking panels are basically circular saw toothed-wheels having teeth protruded in a forward direction with respect to said vehicle frame, wherein a surface between two teeth of said locking panel is essentially said biasing member adapted to bias against said locking member.

7. A twist vehicle, as recited in claim 6, wherein said pair of driving wheels has a pair of hollow cavities formed at a center portion of said pair of driving wheels respectively, for receiving said pair of locking panels respectively.

8. A twist vehicle, as recited in claim 7, wherein said locking member comprises at least a locking ball provided inside said hollow cavities of said pair of driving wheels in such a manner that said locking ball is positioned between two teeth of said toothed wheel, therefore, said biasing member between two teeth of said toothed wheel together with an inner surface of said hollow cavity define a boundary of movement of said locking ball, wherein said boundary has a narrower portion and a thicker portion for restricting a movement of said locking ball.

9. A twist vehicle, as recited in claim 8, wherein said anti-reverse system further comprises a pair of inner pressing rings attached to said pair of inner surfaces of said pair of hollow cavities respectively for biasing against said pair of locking balls respectively.

10. A twist vehicle, as recited in claim 3, wherein said connecting member is frontwardly connected to a front portion of said twisting unit, and wherein a center portion of said twisting unit is pivotally connected to said vehicle frame, so that when clockwise and anti-clockwise movements are subsequently imparted to said steering unit, said connecting member is driven to rotate accordingly, and said twisting unit is therefore also driven to rotate accordingly, causing said twist vehicle to move as a result.

11. A twist vehicle, as recited in claim 4, wherein said connecting member is frontwardly connected to a front portion of said twisting unit, and wherein a center portion of said twisting unit is pivotally connected to said vehicle frame, so that when clockwise and anti-clockwise movements are subsequently imparted to said steering unit, said connecting member is driven to rotate accordingly, and said twisting unit is therefore also driven to rotate accordingly, causing said twist vehicle to move as a result.

12. A twist vehicle, as recited in claim 8, wherein said connecting member is frontwardly connected to a front portion of said twisting unit, and wherein a center portion of said twisting unit is pivotally connected to said vehicle frame, so that when clockwise and anti-clockwise movements are subsequently imparted to said steering unit, said connecting member is driven to rotate accordingly, and said twisting unit is therefore also driven to rotate accordingly, causing said twist vehicle to move as a result.

13. A twist vehicle, as recited in claim 3, wherein a end portion of said steering unit is longitudinally connected to said connecting member, and another end portion of said connecting member is connected to said a front portion of said twisting unit, wherein said connecting member is rotatably and longitudinally connected to said vehicle frame, so that when clockwise and anti-clockwise movements are subsequently imparted to said steering unit, said connecting member rotates accordingly, causing said twisting unit to rotate accordingly, and therefore driving said twist vehicle to move forwardly.

14. A twist vehicle, as recited in claim 4, wherein a end portion of said steering unit is longitudinally connected to said connecting member, and another end portion of said connecting member is connected to said a front portion of said twisting unit, wherein said connecting member is rotatably and longitudinally connected to said vehicle frame, so that when clockwise and anti-clockwise movements are subsequently imparted to said steering unit, said connecting member rotates accordingly, causing said twisting unit to rotate accordingly, and therefore driving said twist vehicle to move forwardly.

15. A twist vehicle, as recited in claim 8, wherein a end portion of said steering unit is longitudinally connected to said connecting member, and another end portion of said connecting member is connected to said a front portion of said twisting unit, wherein said connecting member is rotatably and longitudinally connected to said vehicle frame, so that when clockwise and anti-clockwise movements are subsequently imparted to said steering unit, said connecting member rotates accordingly, causing said twisting unit to rotate accordingly, and therefore driving said twist vehicle to move forwardly.

16. A twist vehicle, as recited in claim 11, further comprising a pair of rear wheels rotatably connected to two sides of a rear portion of said vehicle frame for supporting said twist vehicle.

17. A twist vehicle, as recited in claim 12, further comprising a pair of rear wheels rotatably connected to two sides of a rear portion of said vehicle frame for supporting said twist vehicle.

18. A twist vehicle, as recited in claim 14, further comprising a pair of rear wheels rotatably connected to two sides of a rear portion of said vehicle frame for supporting said twist vehicle.

19. A twist vehicle, as recited in claim 15, further comprising a pair of rear wheels rotatably connected to two sides of a rear portion of said vehicle frame for supporting said twist vehicle.

\* \* \* \* \*